United States Patent [19]

Hebert, Jr. et al.

[11] 4,441,829

[45] Apr. 10, 1984

[54] METHOD FOR PERFORMING A MULTIPLE PAGE GET OPERATION IN A TEXT PROCESSING SYSTEM

[75] Inventors: Raymond A. Hebert, Jr.; Lewis J. Levine; Kenneth O. Shipp, Jr., all of Austin, Tex.

[73] Assignee: International Business Machines, Armonk, N.Y.

[21] Appl. No.: 305,253

[22] Filed: Sep. 24, 1981

[51] Int. Cl.³ .............................................. B41J 3/46
[52] U.S. Cl. ..................................... 400/63; 400/68; 400/83; 400/76; 364/900
[58] Field of Search ..................... 400/2, 3, 62, 63, 64, 400/67, 68, 76, 83, 279, 705.4, 705.5; 364/200, 300, 900; 340/720, 721, 723, 729

[56] References Cited

U.S. PATENT DOCUMENTS 3,025,941  3/1962  Blodgett et al. ............... 400/62 X
4,321,670  3/1982  Timmons ........................ 364/300

FOREIGN PATENT DOCUMENTS 2835320  2/1979  Fed. Rep. of Germany ........ 400/64

Primary Examiner—Ernest T. Wright, Jr.
Attorney, Agent, or Firm—Otto Schmid, Jr.

[57] ABSTRACT

An improved method in an interactive text processing system for creating/revising documents by adding a multi-page insert of text data at a specified location in the document comprising displaying the document, signalling to the system the location within the document into which the text data is to be copied, specifying to the system the identification and location within the document into which the text data is to be copied, specifying to the system the identification and location of the insert text data, scanning the insert text data for INCLUDE instructions, resolving the INCLUDE instructions prior to adding the text data into the document, and copying the specified text data into the document at the signalled location. In a specific embodiment, text data up to ten pages can be copied and up to five levels of nested INCLUDE instructions can be resolved.

4 Claims, 3 Drawing Figures

| Revise Document | example | | Pg. 1 | Ln. 7 | Kyb 1 | Pitch |
|---|---|---|---|---|---|---|
| DSK001 | | | | | | |

GET

| ID | ITEM | YOUR CHOICE | POSSIBLE CHOICES |
|---|---|---|---|
| a | Document Name | | |
| b | Diskette Name | | |
| c | System Page Number (s) | | |
| d | Insert Included Text | 2 | 1 = Yes    2 = No |

If no pages are specified, the entire document will be included.
To specify multiple pages, separate page numbers with spaces.
When finished with this menu, press ENTER.

Type ID letter to choose ITEM; press ENTER:

FIG. 3

METHOD FOR PERFORMING A MULTIPLE PAGE GET OPERATION IN A TEXT PROCESSING SYSTEM

DESCRIPTION

1. Background of the Invention

This invention relates to a text processing system and more particularly to an improved method for copying text data from another document into a document being revised.

2. Description of the Prior Art

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which will appear in the printed document.

In many applications, after all the text has been entered, the operator requests a printed document from the system. The system then enters the printing mode and prints the document, employing the stored format parameters and the text. The document, as stored in memory, comprises a series of data and control characters and is generally stored on the diskette. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then revise the document using any of the commands provided by the system to facilitate revision operations. For example, one command useful in such operations is the GET command which enables copying a page of text from one part of a document to another part of the same document or a different document. It is also known in prior art text processing systems to specify, by means of an INCLUDE command, text data to be added to a document at a specified location.

There has developed in the text processing market a requirement for systems providing enhanced operator productivity without requiring programming skills on the part of the text processing system operator.

SUMMARY OF THE INVENTION

It is accordingly an object of the present invention to provide an improved GET command capable of fetching multiple pages of text data to a designated insertion point in a document.

It is a further object of this invention to provide an improved GET command capable of resolving multiple levels of INCLUDE commands within the pages of data to be inserted into a document.

These and other objects and advantages are achieved with the present method. Briefly, there is provided a text processing system wherein one or more pages of text data are copied into a document by displaying the document to the operator, signalling to the system the location within the document into which the text data is to be copied, specifying to the system the identification and location of the text data, scanning the text data for data control instructions specifying added text to be included within the specified text data, adding the specified added next to the text data prior to copying the text data into the document and copying the specified text data into the document at the signalled location to provide a revised document.

BRIEF DESCRIPTION OF THE DRAWING

FIG. 3 illustrates the GET Menu as it would appear on the display device of FIG. 1 in accordance with the present invention.

DESCRIPTION OF THE PREFERRED EMBODIMENT

Figure 1:
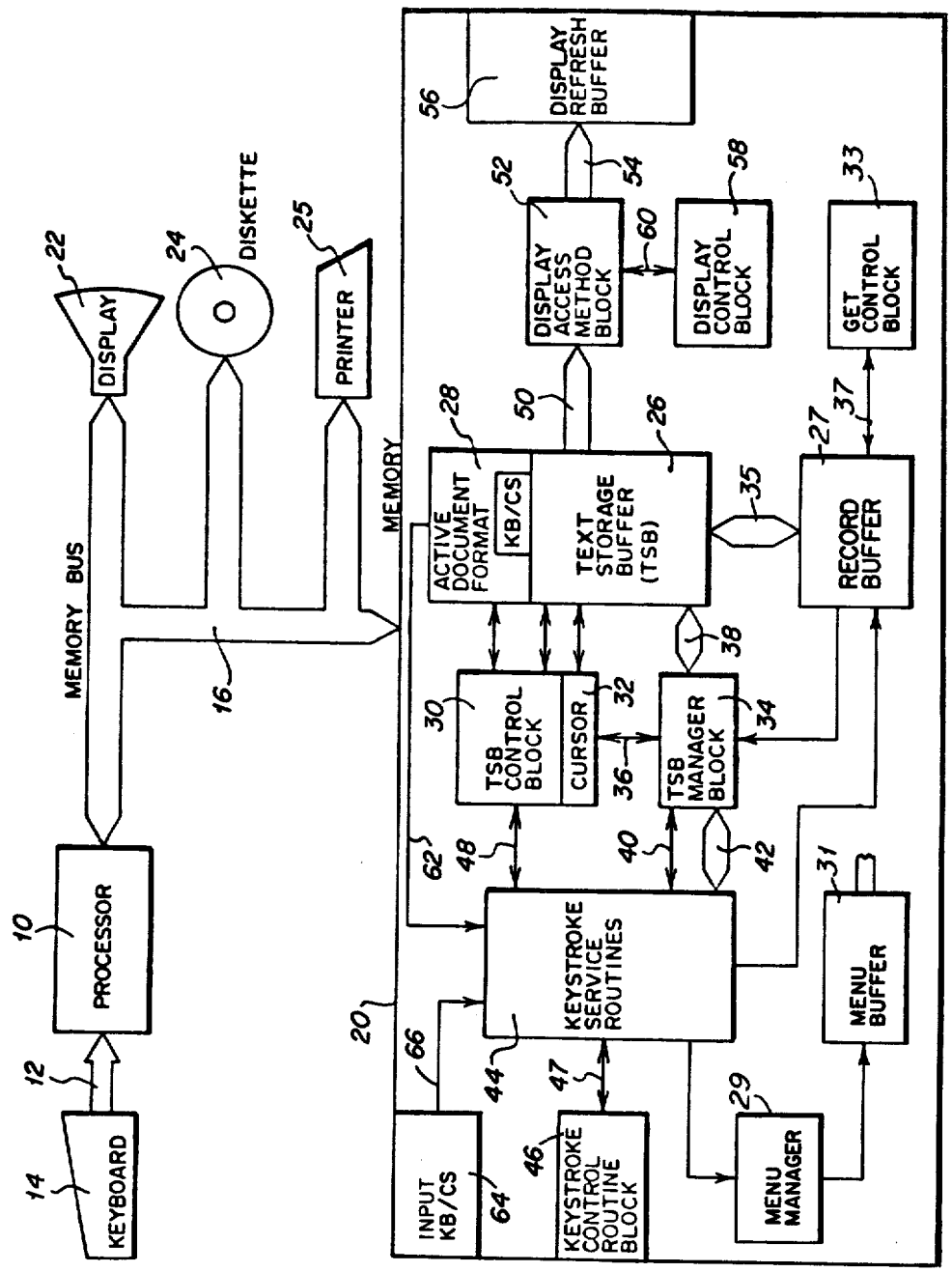
FIG. 1 is a block diagram of the system embodying the present invention.

Referring now to FIG. 1, a portion of the text processing system is shown, including a processor 10 to which is connected a bus 12 leading from a keyboard 14. Character data generated by manual actuation of keyboard 14 applies character-related signals to processor 10 which provides on an output memory bus 16 a data stream in which the characters selected by actuation of keyboard 14 appear suitably encoded.

Keyboard 14 is of the conventional design and arrangement which is commonly used in a Text Processing System such as the IBM Displaywriter System, for example, so a detailed illustration of keyboard 14 is not essential for a proper understanding of the invention. Keyboard 14 comprises a normal set of graphic symbol keys such as letters, numbers, punctuation marks, and special character keys, plus text format or control keys like carriage return, indent, etc. In addition, the keyboard 14 includes a second set of control keys for issuing special control commands to the system. The seond set of control keys include cursor movement keys, keys for setting the keyboard 14 into a number of different modes, etc.

Memory bus 16 extends to a memory unit 20, to a display unit 22, to a diskette unit 24 and to a printer 25.

Memory unit 20 includes a text storage buffer 26 which serves to store the coded data stream comprising the text input initially entered through the keyboard 14. Included in the text storage buffer 26 is a storage section for the identity of the active document format which contains the active document keyboard character set namely, in portion 28. Record buffer 27 provides for additional text storage, and record buffer 27 is coupled to the text storage buffer 26 by channel 35. GET control block 33 controls access to text data to record buffer 27 by means of channel 37.

A text storage buffer control block 30 is linked to text storage buffer 26 and includes a cursor control section 32. The text storage buffer 26 is linked to the data on the diskette unit 24 by a storage access control block (SACB) of conventional design (such as that within the above-mentioned Text Processing System) which is included within storage buffer control block 30.

A text storage buffer manager 34 is linked by channel 36 to the control block 30, by channel 38 to the text storage buffer 26 and by channels 40 and 42 to a keystroke service routine section 44.

A keystroke control routine block 46 is provided to select the appropriate routine for the entered keystroke and this keystroke control routine block 46 is connected to keystroke service routine section 44 by channel 47. The control block 30 is connected to keystroke service routines section 44 by channel 48. Buffer 26 is coupled by channel 50 to a display access method block 52 which is coupled by way of channel 54 to a display refresh buffer 56. A display control block 58 is coupled by channel 60 to the display access method block 52. GET control block 33 functions to fetch data which is stored in record buffer 27.

A channel 62 is connected from the active document format storage portion 28 of text storage buffer 26 to the keystroke service routine section 44. Further, an input keyboard character set (KB/CS) block 64 stores the identity of any desired input keyboard character set of keyboard 14 and is connected by way of channel 66 to the keystroke service routine section 44.

The display access method block 52 has corresponding access method blocks of conventional design, such as that included within the above-mentioned Text Processing System, for the diskette unit 24 and the printer 25. Each of the blocks serves as an interface to the corresponding unit.

The display refresh buffer 56 contains the actual text which is shown on display unit 22 while the buffer 26 contains all of the display text plus control data.

Menu manager 29 selects the appropriate menu to be displayed on display unit 22 and stores the menu image in menu buffer 31. At the appropriate time, the menu image is transferred by channel 50 to the display access method block 52 for routing to the display refresh buffer 56.

In operation of the system of FIG. 1, the encoded data stream on memory bus 16 is stored in the text storage buffer 26. In the process of correction and editing the contents of the text storage buffer 26, selected portions or lines of a page are presented on display unit 22. Stored in active document format section 28 is the code designating the keyboard character set that was employed in the production of the coded data stream appearing on memory bus 16 leading from processor 10 and applied from text storage buffer 26 to display unit 22 for edit.

If it is necessary, for example, to insert a graphic item into the text displayed on display unit 22, then a cursor (not shown), conventionally available on the display unit of the above-mentioned Text Processing System, is placed below the character on display unit 22 at the location immediately preceding which an insert is to be made. The input keyboard character set identification of which the graphic item to be inserted forms a part, is applied by way of channel 66 to the keystroke service routines 44.

Figure 2:
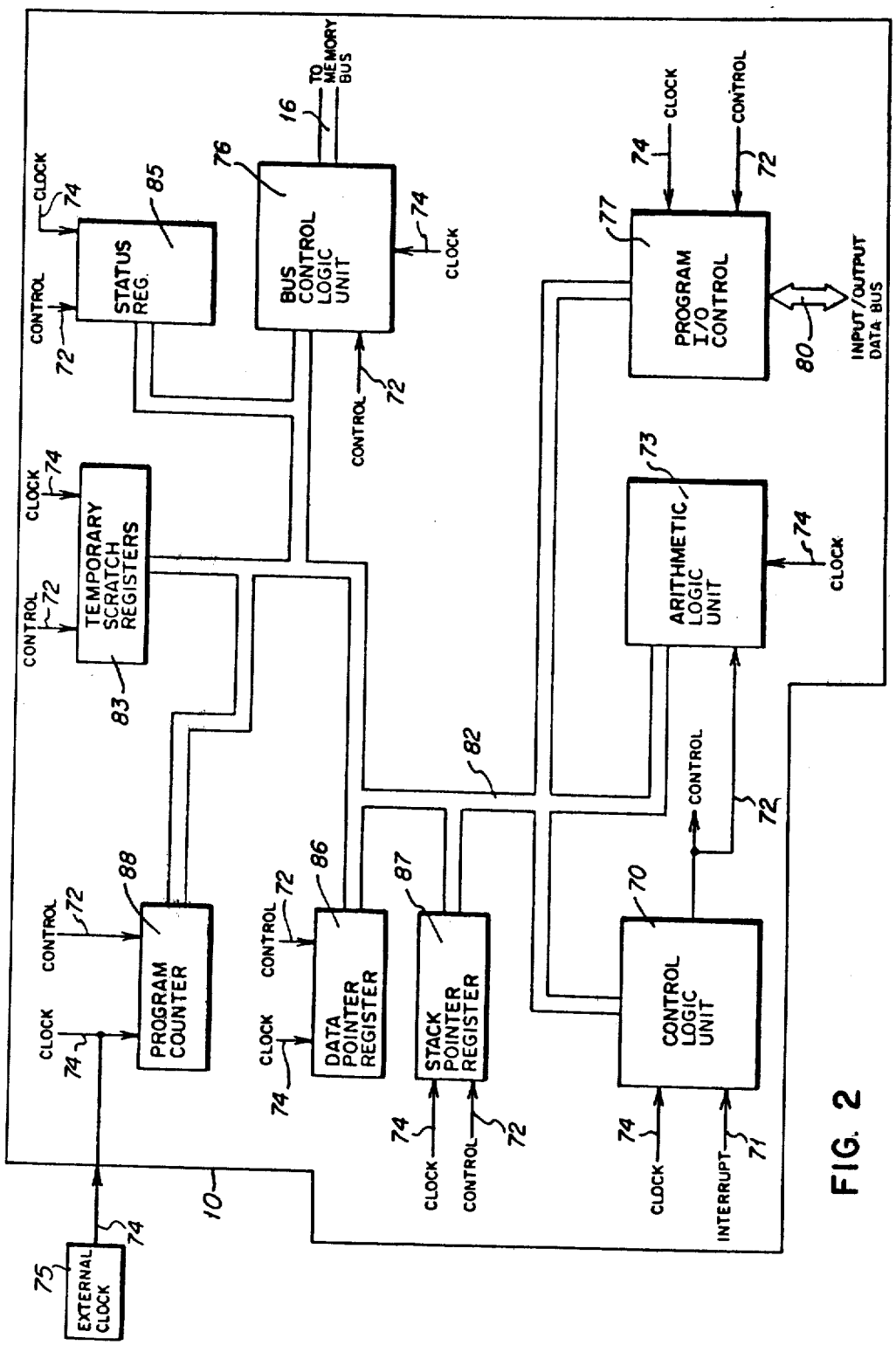
FIG. 2 is a block diagram of the processor shown in FIG. 1.

Referring to FIG. 2, the processor 10 is further detailed to show typical logic hardware elements as found in such processors. The processor 10 may be a commercially available unit, such as from Intel Corporation and identified by the number 8086, or any of the recognized functionally equivalent, currently available microprocessors. Typically, the processor 10 includes a control logic unit 70 which responds to interrupts on a device bus 71 from the keyboard 14. The control logic unit 70 is also connected to a data and address bus 82 interconnected to various other logic units of the processor 10.

In response to a fetch instruction from the random access memory 20, the control logic unit 70 generates control signals to other logic elements of the processor 10. These control signals are interconnected to the various elements by means of a control line 72 which is illustrated directly connected to an arithmetic logic unit 73 and identified as a "control" line 72 to other elements of the processor 10. Sequence operation of control logic unit 70 with other logic elements of the processor 10 is achieved by means of clock pulses input to the processor 10 from an external clock source 75 on a clock line 74. Line 74 is also shown interconnected to other logic elements of the processor 10 detailed in FIG. 2.

Data and instructions to be processed in the processor 10 are input through a bus control logic unit 76. Data to be processed may also come from program input/output control logic unit 77. The bus control logic unit 76 connects storage elements of the random access memory 20 and receives instructions for processing data received from the input/output control logic unit 77 or received from the random access memory 20. Thus, the input/output control logic unit 77 receives data from the keyboard 14 or the random access memory 20 while the bus control logic unit 76 receives instructions and/or data from the same memory 20. Note the different storage sections of the random access memory 20 identifiable for instruction storage and data storage.

Device control information from the processor 10 is output through program input/output logic control unit 77 over a data bus 80. Input data on the data bus 80 from the keyboard 14 is processed internally through the processor 10 by instructions on the bus 82 to temporary scratch registers 83. The arithmetic logic unit 73, in response to a control signal on line 72, and, in accordance with instructions received on an input/output data bus 80, performs computations and the results can be stored in the temporary scratch registers 83. Various other transfers of data between the arithmetic logic unit 73 and other logic elements of the processor 10 are, of course, possible. Such additional transfers may be to a status register 85, data pointer register 86 or a stack pointer register 87. A program counter 88 is also connected through the data stream bus 82 to various other logic elements in the processor 10.

A particular operating sequence for the processor 10 is determined by instructions and data on the memory bus 16 and input data on the bi-directional bus 80. As an example, in response to received instructions, the processor 10 transfers data stored in the scratch registers 83 to one of the registers 85, 86 or 87. Such operations of processors as detailed in FIG. 2 are considered to be well known and understood by one of ordinary skill in the data processing field. A detailed description of each operation of the processor 10 in FIG. 2 is not deemed necessary for a full understanding of the present invention as claimed.

Prior to discussing the flow of the GET control routine and its combination with the text processing system of FIG. 1, an overview of the control system is in order. The specific problem addresses is how to provide an operator interface on a display unit 22 that permits fetching a multiple page insert of text data which may have include instructions in the inserted text data in a manner that promotes ease of learning by operators with no programming skills, ease of use and compatability with existing text processing equipment.

Either during creation or revison of a document, the operator may wish to add a multiple page insert of text data at a particular location in the document. The multiple page GET operation provides this capability since the GET function is designed to copy a designated document into a specified place in a document being created. The INCLUDE command specifies a particular entry of text data to be added to the document at the specified location. In a system which has an INCLUDE command, all Includes must be resolved in the inserted text data prior to the time the text data is inserted into the document being created or revised. To solve this problem in a multiple page GET operation, the ability to resolve multiple level INCLUDES is required.

Preparatory to executing a multiple page GET operation, there are two documents which must be input by the operator to the system. These documents are created in Create/Revise mode and include the original document, at least to the point at which the insert is to be made, and the insert document which contains the multiple pages to be inserted.

Once the original and the insert documents have been created, the operator displays the original document on display unit 22, positions the cursor to the desired point of insertion and presses the GET key (conventionally placed such as the placement in the above-mentioned Text Processing System, for example) which is one of the control keys on keyboard 14. In response to this action, menu manager 29 outputs through menu buffer 31 to display unit 22, the GET Menu, an illustration of which is shown in FIG. 3. This menu instructs the operator to make selections concerning the name, location and page numbers of the specified text data to be inserted at the desired point in the document, and a further selection whether or not included text is to be inserted into the specified text data prior to its insertion at the desired point in the document.

The prompt line of the display instructs the operator to type the ID letter to choose an ITEM. The operator makes this selection by typing the appropriate letter in place of the underlined small square at the end of the prompt line of the display and pressing the ENTER key (conventionally placed such as the placement in the above-mentioned Text Processing System, for example) on keyboard 14. The underline represents the position of the cursor and the small square represents the location at which the first keyed character is displayed. For example, to specify the Document Name for the insert document, the operator types an "a", followed by the document name, in the designated position and presses the ENTER key. This selection is followed by operator input to designate the name of the diskette unit 24 on which the insert document is stored, the page number(s) of the document to be copied and an option whether or not to Insert Included Text, i.e., that text specified by INCLUDE commands. Once the last of these selections is made, the operator presses ENTER, at which time the system starts execution of the multiple page GET.

The original document up to the designated insertion point is placed in the Text Storage Buffer 26 and the first page of the insert document is fetched, under control of GET control block 33, into Record Buffer 27. The pagination routine is then invoked to scan the page in Record Buffer 27 for data control instructions. As data control instructions are encountered, the instructions are resolved prior to proceeding through the page of the insert document. To resolve an INCLUDE instruction, the data specified to the INCLUDE is fetched and scanned as it is added into the page of the insert document stored in Record Buffer 27. It is possible that this text data will contain control codes including an additiional INCLUDE. Each nested level of INCLUDE up to five is accommodated by resolving the INCLUDE prior to the time the data is added to the page of the insert document stored in Record Buffer 27. As pages of the insert document are scanned, they are added to the original document in Text Storage Buffer 26 until a full page is stored as determined by the pagination routine. At a Page End, the TSB manager 34 stores the completed page on the designated diskette unit 24. In addition, if printing is designated by the operator, the page is also sent to the printer 25. The multiple page GET continues in this manner until all of the pages in the insert document along with any inserted text data have been added to the original document at the designated insert point.

In a specific embodiment, an entire document can be copied by the use of an INCLUDE instruction by not specifying the page number(s) since a default value is used to include all pages in this case. When page numbers are specified by the operator, in this embodiment a total of ten pages can be specified by the operator for each multiple page GET instruction.

Suitable program routines in program design language (PDL) for implenting the described Multiple Page GET are shown in the following tables:

TABLE 1

DESCRIPTIVE-NAME = GET KEYSTROKE PROCESSOR

FUNCTION = The GET keystroke processor contains the routines necessary to display the GET menu when the GET key is pressed and set up for the GET operation.
BEGIN (TBOGETKP)
MOVE CURSOR IF NOT IN VALID KEYING AREA
ALLOCATE THE REQUIRED DATA AREAS
INITIALIZE THE SECONDARY SACB
UNTIL THE MENU HAS BEEN SUCCESSFULLY ENTERED OR HAS BEEN CANCELLED WITHOUT CHANGES DO
IF THE OPERATOR CANCELLED WITH CHANGES OR THEN SETUP THE DOCUMENT AND DISKETTE NAME WORK FIELDS
INITIALIZE THE DISKETTE NAME MENU DESCRIPTOR
DETERMINE WHETHER A DEFAULT DISKETTE EXISTS ON THE SYSTEM AND MOVE THE NAME INTO THE DISKETTE WORK BUFFER
INITIALIZE THE PAGE NAME LIST MENU DESCRIPTOR
INITIALIZE THE RESOLVE INCLUDES MENU DESCRIPTOR
ENDIF
DISPLAY THE GET PAGES MENU
IF THE OPERATOR CANCELLED THE GET MENU WITH NO CHANGES THEN
TURN OFF THE 'REDISPLAY MENU' FLAG
ELSE
IF THE MENU WAS ENTERED THEN
ISSUE THE 'GETTING PAGES' MESSAGE
SAVE THIS LOCATION IN LOCATION POINTER 14
SETUP THE GETPAGE CONTROL BLOCK FOR FETCHING IN THE REQUESTED PAGES
GETPAGE VALIDATE DATA AND FETCH IN REQUESTED PAGES MACRO
IF WE GET A SUCCESSFUL RETURN CODE FROM FROM TEOPGFCH THEN
SET GET DEFAULT NAMES EXIST FLAG ON
SAVE THE OPERATOR ENTERED DOCUMENT AND DISKETTE NAME AS THE DEFAULT VALUES

TABLE 1-continued
DESCRIPTIVE-NAME = GET KEYSTROKE PROCESSOR

```
POINT TO THE BEGINNING OF THE INSERTED
TEXT
WHILE THE CURRENT LOCATION IS LESS THAN
LOCATION POINTER 14 (LOCATION POINTER
14 POINTS TO END OF THE INSERTED TEXT)
DO
  IF WE ARE POINTING TO A COPY OF THE
  INSERTED RESERVED CHARACTER THEN
    DELETE THAT INSERTED CHARACTER
  ELSE
    IF WE ARE POINTING AT AN INCLUDE 2B
    AND THE OPERATOR WANTS TO RESOLVE
    INCLUDES THEN
      SETUP THE GET PAGES CONTROL BLOCK
      RESOLVE THE INCLUDE
      EITHER HANDLE EXECUTION ERRORS OR
      DELETE THE INCLUDE
    ELSE
      SKIP OVER THE SEARCH CHARACTER THAT
      THAT WAS FOUND
    ENDIF
  ENDIF
BGNWHILE
  MVTONEXT FIND THE NEXT INSERTED
  RESERVED CHARACTER OR 2B
  COMPARE THE CURRENT LOCATION WITH
  LOCATION POINTER 14 (POINTING TO THE
  END OF THE INSERTED PAGES)
ENDDO
IF ANY INCLUDES WERE IN ERROR THEN
  ISSUE THE APPROPRIATE MESSAGE TO THE
  OPERATOR
ENDIF
DELETE THE INSERTED RESERVED CHARACTER
POINT TO THE FIRST FETCHED CHARACTER
ELSE (A FETCH PAGE EXECUTION ERROR
OCCURRED)
  DETERMINE AND ISSUE THE APPROPRIATE
  MESSAGE
  DELETE THE INSERTED TEXT AND RESERVED
  CHARACTER
ENDIF
ENDIF
ENDIF
ENDDO
SAVE THE RETURN CODE
RESETLOC RESET LOCATION POINTERS
7 THROUGH 14
(7-12 USED BY TBORSINC)
IF A PREVIOUS DOCUMENT EXISTS THEN
  CLOSE THE DOCUMENT
ENDIF
FREE STORAGE USED BY THE GET CONTROL BLOCK,
THE MENU DESCRIPTOR,
THE MENU CONTROL BLOCK,
THE DOCUMENT/DISKETTE WORK BUFFERS,
AND THE MENU BUFFER
RESTORE THE PREVIOUS CONTEXT FIELD
INVOKE TCMDAML REDISPLAY THE (UPDATED)
SCREEN IF NO MAJOR ERRORS OCCURRED
RETURN TO CALLER END (TBOGETKP)
```

TABLE 2
DESCRIPTIVE-NAME = GET PAGE FETCH

```
FUNCTION = Fetches the pages requested by the operator
and inserts into TSB.
BEGIN (TBOPGFCH)
IF WE ARE NOT FETCHING PAGES FROM A MERGE
SHELL DOCUMENT THEN
  IF THE EDITTING AND CURRENT DOCUMENT NAMES
  ARE EQUAL THEN
    IF WE ARE RESOLVING AN INCLUDE THEN
      SET BAD RETURN CODE AND EXIT
    ELSE
      IF THERE WAS NO PAGE NAME LIST SPECIFIED
      THEN
        IF WE ARE AT THE END OF THE DOCUMENT THEN
          SAVE THE CURRENT PAGE NAME AS THE LAST
```

TABLE 2-continued
DESCRIPTIVE-NAME = GET PAGE FETCH

```
          PAGE TO FETCH IN
        ELSE (THE CURSOR IS NOT AT THE END OF THE
        DOCUMENT)
        ENDIF
      ENDIF
    ENDIF
    INSERT A PAGE END (TO LOCK IN THE LAST PAGE
    TO BE FETCHED)
    TURN ON THE APPROPRIATE FLAG
  ELSE
    CHECK WHETHER WE MUST CLOSE THE PREVIOUS
    (INCLUDE) DOCUMENT
    IF A PREVIOUS DOCUMENT EXISTS THEN
      IF THE PREVIOUS AND CURRENT DISKETTE NAMES
      ARE EQUAL THEN
        COMPARE THE PREVIOUS AND CURRENT DOCUMENT
        NAMES
      ENDIF
      IF THE DOCUMENTS ARE NOT EQUAL THEN
        CLOSE THE PREVIOUS DOCUMENT
        OPEN THE CURRENT DOCUMENT
      ENDIF
    ELSE
      OPEN THE CURRENT DOCUMENT
    ENDIF
  ENDIF
  IF THE ENTIRE DOCUMENT IS TO BE FETCHED THEN
    SET PAGE NAME TO DOCUMENT FORMAT
    MOVE DOCUMENT FORMAT INTO THE CURRENT
    PAGE NAME BUFFER
  ELSE
  ENDIF
  WHILE THE GET COMPLETED FLAG IS OFF DO
    GET THE FIRST AND LAST RECORD OF THE PAGE
    TO BE FETCHED
    INSERT BLOCK OF TEXT
    BGNWHILE
      IF THE PAGE NAME LIST IS NULL THEN
        QUERY FOR THE NEXT PAGE NAME
        IF FETCHING THE EDITTING DOCUMENT
          IF WE FETCHED THE LAST PAGE THEN
            SET THE DONE FLAG
          ELSE
            IF THE NEXT PAGE IS THE LAST TO FETCH IN
            THEN
              SET ON THE 'GOT LAST PAGE' BIT
            ENDIF
          ENDIF
        ELSE
          IF THE NEXT PAGE IS PAGE N+1 THEN
            SET GET COMPLETE FLAG ON
          ENDIF
        ENDIF
      ELSE
        IF MORE PAGES EXIST IN THE PAGE NAME LIST
        BUFFER THEN
          SEARCH FOR THE NEXT PAGE NAME IN THE PAGE
          NAME LIST
          IF A PAGE NAME WAS NOT FOUND THEN
            TURN ON THE GET COMPLETED FLAG
          ELSE
            FIND THE END OF THIS PAGE NAME AND
            COMPUTE THE PAGE NAME LENGTH
          ENDIF
        ELSE
          TURN ON THE GET COMPLETE FLAG
        ENDIF
      ENDIF
    ENDDO
    SET THE RETURN CODE
    RETURN TO CALLER
    END TBOPGFCH
```

TABLE 3
DESCRIPTIVE-NAME = RESOLVE INCLUDES

```
FUNCTION = At the request of the operator, routines
are provided to scan all text for includes and to
```

TABLE 3-continued

DESCRIPTIVE-NAME = RESOLVE INCLUDES

```
resolve the includes.
BEGIN (TBORSINC)
CREATE THE INCLUDE INSTRUCTION
STORAGE BUFFER
DELETE LINE END FOLLOWING INCLUDE
IF ONE IS THERE
CALL SAVELOC SAVE THE LOCATION
OF THE INCLUDE WITH LOCATION POINTER 12
CALL SAVELOC - SAVE THE LOCATION
OF THE INCLUDE INTO DOCPA LOCATION POINTER
READJUST THE EMBED LEVEL FOR THIS SPECIFIC
INCLUDE
IF WE ARE NOT PAST THE 5TH LEVEL OF INCLUDE
EMBEDDING THEN
SAVE THE POSITION OF THE CHARACTER
FOLLOWING THE INCLUDE AS THE TEXT
INSERTION POINT
PUT THE INCLUDE INFORMATION INTO THE GET
PAGES CONTROL BLOCK AS FOLLOWS:
MOVE THE CODE PAGE ID INTO THE INCLUDE
DOCUMENT NAME FIELD OF THE
GET CONTROL BLOCK
MOVE THE DOCUMENT NAME OF THE INCLUDE INTO
THE GET CONTROL BLOCK INSURING THAT IT
FOLLOWS THE CODE PAGE AND IS PADDED TO THE
RIGHT WITH BLANKS
WHILE THERE ARE PARAMETER ELEMENTS
REMAINING IN THE INCLUDE DO
IF THIS IS A DISKETTE PARAMETER ELEMENT THEN
MOVE THE DISKETTE NAME INTO THE GET PAGES
CONTROL BLOCK SUCH THAT IT IS LEFT
JUSTIFIED AND PADDED WITH BLANKS
ELSE
PUT THE PAGE NAME INTO THE PAGE NAME LIST
BUFFER (FOLLOWED BY A BLANK)
ENDIF
BGNWHILE
DETERMINE WHETHER THE CHARACTER
FOLLOWING THIS PARAMETER IS WITHIN
THE INCLUDE 2B ENDDO
IF NO DISKETTE PARAMETER WAS SPECIFIED IN THE
INCLUDE INSTRUCTION THEN
MOVE THE DEFAULT DISKETTE NAME INTO THE
INCLUDE
DISKETTE NAME FIELD OF THE GET PAGES
CONTROL BLOCK (DEFAULT BEING THE EDITTING
DOCUMENTS DISKETTE NAME)
ENDIF
RESTORE THE OFFSET ADDRESS OF THE
BEGINNING OF THE PAGE NAME LIST
IF THE INCLUDE IS AT THE BEGINNING
OF THE PAGE
THEN
SAVE THE INCLUDE
DELETE THE INCLUDE
ELSE
SEE IF FPM OR EAM IS BETWEEN INCLUDE AND
START OF PAGE
DELETE THE INCLUDE
ENDIF
INVOKE TBOPGFCH
HANDLE GETPAGE ERRORS
RESTORE THE INCLUDE (IF IT WAS SAVED OFF)
IF AN INCLUDE DOCUMENT WAS OPENED THEN
COPY THE CURRENT INCLUDES DOCUMENT AND
DISKETTE NAME FIELDS INTO THE PREVIOUS
INCLUDES' DOCUMENT AND DISKETTE NAME
FIELDS
ENDIF
ELSE
SET THE EMBED LEVEL TO 5
SET THE RETURN CODE
ENDIF
RETURN TO CALLER END (TBORSINC)
```

While the invention has been particularly shown and described with reference to a preferred embodiment it will be understood by those skilled in the art that various other changes in form and detail may be made without departing from the spirit and scope of the invention.

Having thus described our invention, what we claim as new and desire to secure by Letters Patent is:

1. In an interactive text processing system which includes a keyboard and a display unit and in which a document input by way of a keyboard is stored, displayed to an operator, and further processed in accordance with directions supplied to said system by an operator interacting with the keyboard and display unit, an improved method for copying one or more pages of text into a document from another part of the same document or from a different document, said method comprising:
   displaying to the operator the document into which one or more pages of text data is to be copied;
   signalling to the system the location within said document into which the text data is to be copied;
   specifying to the system the identification and location of said text data;
   scanning said specified text data for data control instructions contained within said specified text data specifying added text data to be included within said specified text data;
   adding said specified added text data to said specified text data prior to copying said specified text data into said document; and
   copying said specified text data as modified by said added text data into said document at the signalled location to provide a revised document.

2. The method recited in claim 1 in which specified text data up to ten pages can be copied into said document.

3. The method recited in claim 1 in which said data control instructions comprise INCLUDE instructions.

4. The method recited in claim 3 in which said INCLUDE instructions can be optionally resolved in said specified text data up to five nested levels.

* * * * *